UNITED STATES PATENT OFFICE.

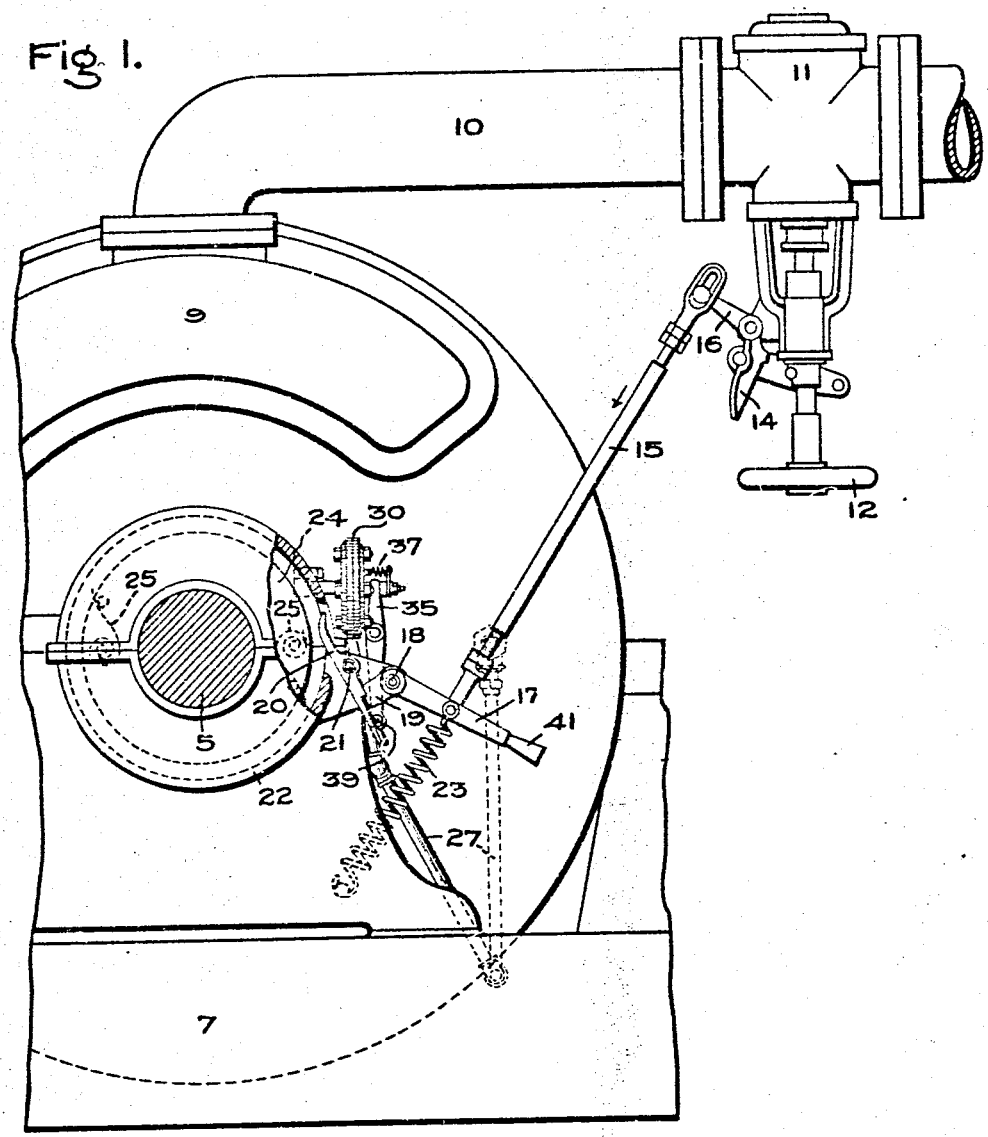

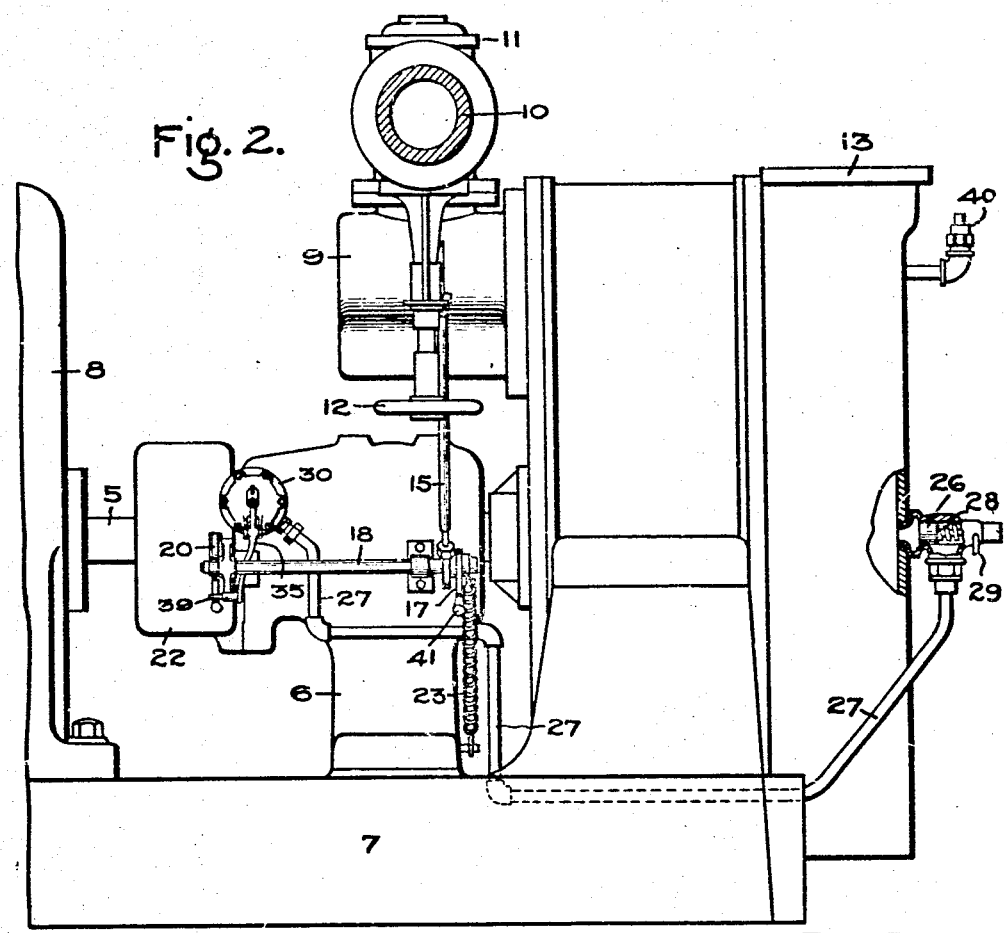
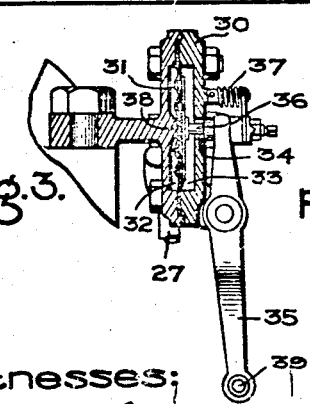
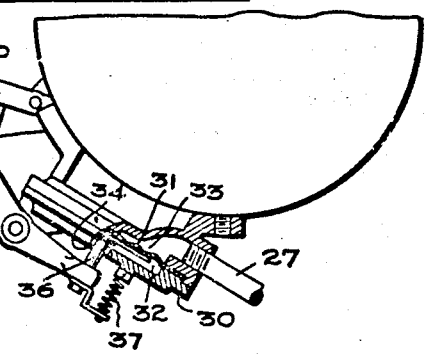

FREDERIC R. C. BOYD, OF LYNN, MASSACHUSETTS, ASSIGNOR TO GENERAL ELECTRIC COMPANY, A CORPORATION OF NEW YORK.

EMERGENCY GOVERNING MECHANISM FOR TURBINES.

960,259.   Specification of Letters Patent.   Patented June 7, 1910.

Application filed October 6, 1909. Serial No. 521,305.

*To all whom it may concern:*

Be it known that I, FREDERIC R. C. BOYD, a citizen of the United States, residing at Lynn, in the county of Essex, State of Massachusetts, have invented certain new and useful Improvements in Emergency Governing Mechanism for Turbines, of which the following is a specification.

This invention relates to elastic fluid turbines and its object is the provision of mechanism for safeguarding a turbine against injury due to abnormal pressure in any given region of the turbine, and particularly within what might be called the low-pressure stage or stages of a multi-stage turbine. To accomplish this end said mechanism operates to automatically shut off the supply of motive fluid to the turbine whenever the predetermined safe pressure is exceeded. It can, however, be manually operated when desired.

In the accompanying drawings illustrating one of the embodiments of my invention, Figure 1 is a partial end view of a turbine with parts in section; Fig. 2 is a side view of the turbine with a portion in section; Fig. 3 is an enlarged detail view of a portion of the governing mechanism; and Fig. 4 is a partial end view showing a slightly different arrangement of the invention.

In the turbine shown in the drawings to illustrate the general operation of the invention the rotor is carried by a shaft 5 mounted in bearings 6 supported by a bed-plate 7. The shaft 5 drives an electric generator 8 or other load. Steam or other motive fluid is conveyed to the steam-chest 9 of the turbine by a pipe 10 leading from any suitable source of supply. Located in the pipe line 10 is a combined emergency and stop valve 11 of any well known construction. The valve shown is of the so-called sliding nut type wherein the nut is normally held in position by a latch which is moved or tripped by the speed or other governing devices under certain conditions to close the valve suddenly. Under normal conditions of operation this valve can be manually operated and adjusted by means of a hand-wheel 12 and its screw-threaded stem, engaging said nut, to control the flow of steam through the pipe 10 and it can also be tripped to close quickly under emergency conditions by mechanism to be described later. Obviously separate valves could be employed to perform each of these functions if desired. The exhaust steam from the turbine is led away from the outlet 13 to a condenser or to the atmosphere as preferred. The admission of motive fluid from the steam-chest 9 to the interior of the turbines to drive the turbine rotor can be controlled by any suitable governing mechanism (not shown) which proportions the supply of energy to the load and thus maintains the speed of rotation constant. Under some conditions the automatic governing mechanism can be omitted and the speed controlled by throttling the supply of steam to the rotor by a suitable hand valve or valves. The valve 11 might be used for this purpose under some circumstances.

Under normal operating conditions a latch or lock 14 holds the valve 11 open in any position to which it may have been adjusted by the wheel 12. The valve has a constant tendency to close due to unbalanced steam pressure or gravity, or both. It may be assisted in its closing operation by any suitable type of motor or mechanism, or a combination of the two. The rod or link 15 has at one end a sliding and pivotal connection with the arm 16 of the latch 14. The other end of the rod 15 is pivotally connected with a lever or arm 17 on a shaft 18 mounted in bearings on the pillow-block 6. The shaft 18 also carries an arm 19 which engages a trigger or lever 20 pivoted at 21 on a casing 22. The parts 17, 18 and 19 form a sort of bell-crank lever. The spring 23 tends to turn this lever about its pivot and the lever is normally held against turning by the trigger 20.

Mounted on the shaft 5 within the casing 22 is an emergency speed governing device 24 of any approved construction. One end of the trigger 20 projects through an opening in the casing into rather close proximity to the governor 24. When the speed of the turbine rises above a predetermined safe limit, the governor, or some member of it, strikes against the adjacent end of the trigger and releases the bell-crank lever 17, 18, 19 from its restraint. The spring 23 is then free to move the rod 15 in the direction of the arrow, Fig. 1, and through said rod to release the latch 14 to permit the valve 11 to close suddenly, thereby shutting off the supply of steam to the turbine. The sliding connection between the end of the rod 15 and the arm 16 causes the spring 23 to impart a hammer blow to the latch thus insuring the quick and effective release of said latch.

The form of emergency speed governor illustrated includes two clock springs 25 that normally occupy the position shown in Fig. 1. When the speed of the turbine rises above the predetermined safe limit, the ends of the springs move outward under the influence of centrifugal force and strike the projecting end of the trigger 20, thereby tripping the latch and closing the valve 11 in the manner above described.

The mechanism for shutting down the turbine when the steam pressure in any given region thereof rises above a desirable or safe limit, includes a valve 26 controlling the flow through a conduit 27 which communicates with said region. A spring 28 of suitable strength normally holds the valve closed, but permits it to open when the pressure in the adjoining region of the turbine rises sufficiently to overcome the action of the spring. The valve 26 is also provided with a small vent pipe 29. This vent pipe prevents a rise in pressure in the conduit 27 tending to trip the emergency valve which might be caused by any slow leakage of fluid through the valve 26 although the pressure on said valve be insufficient to raise it from its seat. The vent is made so very small that when the valve 26 is open the quantity of steam escaping through the vent is practically negligible. The pipe or conduit 27 leads to a frame or casing 30 mounted on the pillow-block 6 or other convenient support adjacent the trigger 20. A diaphragm 31, preferably of thin phosphor bronze, extends across the interior of the casing dividing it into two chambers 32 and 33. The pressure in the conduit 27 is communicated to the chamber 32 and the adjoining face of the diaphragm, while the chamber 33 and the other face of the diaphragm are subjected to atmospheric pressure communicated through an opening 34 in the wall of the casing. A lever 35 is pivoted intermediate its ends on the casing 30 with one end adjacent the opening 34 and a stud or pin 36 mounted in said end projects through the opening 34 into engagement with the diaphragm 31. A spring 37 tends to hold the lever and pin in the position shown in Figs. 3 and 4 with the center of the diaphragm pressed against a boss 38 on the wall of the casing. The outer end of the lever 35 carries a pin 39 which is arranged in rather close proximity to the outer end of the trigger 20. The stud or pin 36 may be adjustably mounted in the end of the lever 35 to thereby adjust the relative position of the pin 39 and the trigger 20.

When the valve 26 is opened as above described by the rise in pressure in the turbine casing, said pressure is communicated by the conduit 27 to the chamber 33 and acts on the diaphragm 31 to move the adjacent end of the lever 35 outwardly against the action of the spring 37. At the same time the other end of the lever 35 is so moved as to cause the pin 39 to strike against the trigger 20 thereby tripping the bell-crank lever 17, 18, 19 and permitting the spring 23 to trip the emergency valve in the manner described above in connection with the closing of the valve by the emergency speed governor. When the valve 26 closes again the steam in the conduit 27 escapes through the vent 29 thereby relieving the pressure on the diaphragm. The valve 26 is preferably a pop valve. Such a valve opens very quickly when the pressure rises to the permissible maximum and said pressure is as quickly and suddenly applied to the diaphragm, thus causing a quick and positive action of the parts actuated by it.

In addition to the above mechanism, a pop or sentinel valve 40 set for a slightly higher pressure than the valve 26 may be connected to the given region of the turbine to relieve the pressure therein should the valve 26 and its related apparatus fail to act for any reason. The operation of the valve 40 is an indication or signal to the attendant that the automatic device is not working properly. The turbine can then be shut down by manually tripping the stopping mechanism and the trouble investigated and remedied.

The outer end of the trigger 20 is placed in a readily accessible location so that the trigger may be manually actuated, thus permitting the attendant to quickly close the valve 11 and shut down the turbine when desired. The lever arm 17 is provided with a handle 41 to facilitate the resetting of valve tripping mechanism in the position shown in the drawings.

The casing 30, lever 35, etc. may be arranged in a vertical position, Figs. 1, 2 and 3, or horizontally or at an angle to both of said arrangements, Fig. 4, as best suits the conditions of operation and installation. The valve 26 may be connected with any desired region of the turbine. In the drawings it is shown as arranged to receive pressure from the low pressure or exhaust stage of the turbine, but it can be connected to any other stage or region as required by the operating conditions. The abnormal rise in pressure in a given stage or region may be due to various causes such as, among others, the loss of vacuum in the condenser of a condensing turbine installation, or to obstruction of the turbine exhaust by the failure of the attendant to properly open the valves in the exhaust conduits, or the obstruction of the pipes taking steam from one of the intermediate stages of the turbine for industrial purposes, or to the failure of the regulating mechanism in a mixed pressure turbine to properly control the admission of high pressure motive fluid to said turbine.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, a prime mover, a valve for controlling the supply of motive fluid to the prime mover, mechanism which normally holds the valve open but can be tripped to close the valve suddenly, and means for tripping said mechanism when the pressure in a given region of the prime mover rises to a predetermined value, said means including a pressure actuated device, and means responsive to the rise in pressure in said region for controlling the admission of pressure to said device to close the valve.

2. In combination, a prime mover, a valve for controlling the supply of motive fluid to the prime mover, means which normally holds the valve open but can be tripped to close the valve suddenly, and mechanism responsive to a predetermined rise in pressure in a given region of the prime mover which effects the tripping of said valve and thereby shuts down the prime mover, said mechanism including a pressure actuated device, a conduit leading from said region to the device, and a valve for controlling the flow through the conduit which opens when the pressure in said region rises to the predetermined valve.

3. In combination, a prime mover, a valve for controlling the supply of motive fluid to the prime mover, means which normally holds the valve open but can be tripped to close the valve suddenly under emergency conditions, and mechanism responsive to a predetermined rise in pressure in a given region of the prime mover which effects the tripping of said valve and thereby shuts down the prime mover, said mechanism including a pressure actuated diaphragm, a conduit leading from said region to said mechanism, and a valve for controlling the flow through the conduit which opens when the pressure rises to the predetermined value and permits said pressure to act on the diaphragm and thereby operate the tripping means.

4. In combination, a prime mover, a valve controlling the supply of motive fluid to the prime mover, mechanism for tripping the valve to close it suddenly under emergency conditions, and means responsive to a predetermined rise in pressure in a given region of the prime mover which effects the tripping of said valve and thereby shuts down the prime mover, said means including a frame or casing, a diaphragm carried thereby, a device for transmitting motion from the diaphragm to said mechanism, a conduit leading from said region to the casing, and a valve controlling the flow through the conduit that opens when the pressure in said region rises to the predetermined value and permits said pressure to act on the diaphragm and thereby operate the tripping mechanism.

5. In combination, a turbine, a valve for controlling the supply of motive fluid to the turbine, mechanism for tripping the valve to close it suddenly under emergency conditions, and means responsive to a predetermined rise in pressure in a given region of the turbine which effects the tripping of said valve and thereby shuts down the turbine, said means including a casing, a diaphragm mounted in the casing, a lever for transmitting motion from the diaphragm to said mechanism, a conduit leading from said region and opening into the casing at one side of the diaphragm, and a valve for controlling the flow through the conduit that opens when the pressure in said region rises to a predetermined value and permits said pressure to act on the diaphragm and thereby cause said lever to actuate the tripping mechanism.

6. In combination, a turbine, a valve for controlling the supply of motive fluid to the turbine, mechanism for tripping the valve to close it suddenly under emergency conditions, and means responsive to a predetermined rise of pressure in a given region of the turbine which effects the tripping of said valve and thereby shuts down the turbine, said means including a casing, a diaphragm mounted in the casing, a lever mounted on the casing with one end adjacent one side of the diaphragm and the other end adjacent said mechanism, a conduit leading from said region and opening into the casing at the opposite side of the diaphragm, and a valve controlling the flow through the conduit that opens when the pressure in said region rises to a predetermined value and permits said pressure to act on the diaphragm and thereby cause said lever to actuate the tripping mechanism.

7. In combination, a turbine, a valve for controlling the supply of motive fluid to the turbine, mechanism for tripping the valve to close it suddenly under emergency conditions, and means responsive to a predetermined rise in pressure in a given region of the turbine which effects the tripping of said valve and thereby shuts down the turbine, said means including a casing, a diaphragm mounted in the casing, a lever pivoted intermediate its ends on the casing with one end adjacent one side of the diaphragm and the other end adjacent said mechanism, a device which tends to keep the first mentioned end of the lever in engagement with the diaphragm, a conduit leading from said region and opening into the casing at the opposite side of the diaphragm, and a valve controlling the flow through the conduit that opens when the pressure in said region rises to the predetermined value and permits said pressure to act on the diaphragm and thereby cause said lever to operate the tripping mechanism.

8. In combination, a turbine, a valve for controlling the supply of motive fluid to the turbine, mechanism for tripping the valve to close it suddenly under emergency conditions, and means responsive to a predetermined rise in pressure in a given region of the turbine which effects the tripping of said valve and thereby shuts down the turbine, said means including a casing, a diaphragm mounted in the casing, a lever pivoted intermediate its ends on the casing with one end adjacent the diaphragm and the other end adjacent said mechanism, a pin mounted in the first mentioned end of the lever that engages one side of the diaphragm, a spring that tends to keep the pin in engagement with the diaphragm, a conduit leading from said region and opening into the casing at the opposite side of the diaphragm, a pop valve for controlling the flow through the conduit that opens when the pressure in said region rises to the predetermined value to permit said pressure to act on the diaphragm and thereby cause said lever to actuate the tripping mechanism, and a vent for said valve.

9. In combination, a turbine, a valve for controlling the supply of motive fluid to the turbine, mechanism for tripping the valve to close it suddenly under emergency conditions, and means responsive to a predetermined rise in pressure in a given region of the turbine that effects the tripping of said valve and thereby shuts down the turbine, said means comprising a casing, a diaphragm mounted in the casing, a lever pivoted intermediate its ends on the casing with one end adjacent the diaphragm and the other end adjacent said mechanism, a pin mounted in the first mentioned end of the lever, there being an opening in the wall of the casing through which the pin projects into engagement with the center of one side of the diaphragm, a spring connected at one end to the casing and at the other end to the lever that tends to keep the pin in engagement with the diaphragm, a projection on the other wall of the casing that normally engages the center of the opposite side of the diaphragm, a conduit leading from said region and opening into the casing on the same side of the diaphragm, a pop valve for controlling the flow through the conduit that opens when the pressure in said region rises to the predetermined value and permits said pressure to act on the diaphragm thereby causing the lever to operate the tripping mechanism, and a vent for said valve.

10. In combination, a prime mover, a valve for controlling the supply of motive fluid to the prime mover, mechanism which normally holds the valve open but can be tripped to close said valve suddenly under emergency conditions, and means responsive to a predetermined rise in pressure in a given region of the prime mover which effects the tripping of said valve and thereby shuts down the prime mover, said means including a pressure actuated device, a conduit leading from said region to the device, a valve controlling the flow through the conduit which opens when the pressure in said region rises to the predetermined value and permits said pressure to act on the device and thereby operate the tripping mechanism, and a vent for the portion of the conduit between the valve and said device.

11. In combination, a prime mover, a valve for controlling the supply of motive fluid to the prime mover, mechanism which normally holds the valve open but can be tripped to close the valve suddenly under emergency conditions, and means responsive to a predetermined rise in pressure in a given region of the prime mover which effects the tripping of said valve and thereby shuts down the prime mover, said means including a pressure actuated device, a conduit leading from said region to the device, a valve between said region and the conduit which opens when the pressure in said region rises to the predetermined value to permit said pressure to act on said device and thereby operate the tripping mechanism, and means for relieving the pressure on the conduit side of the valve when said valve is closed.

In witness whereof, I have hereunto set my hand this first day of October, 1909.

FREDERIC R. C. BOYD.

Witnesses:
JOHN A. MCMANUS, Jr.,
CORINNE HEDLY.